Oct. 20, 1953 J. R. HOOVER 2,656,292
SHEET RUBBER HAVING A NONSTICKING
LINER AND METHOD OF MAKING SAME
Filed April 4, 1950
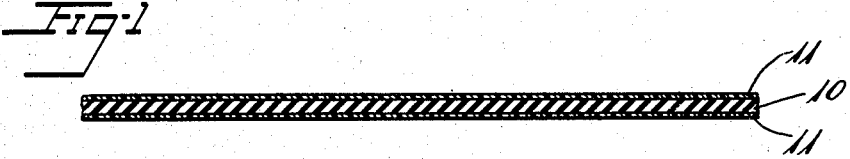
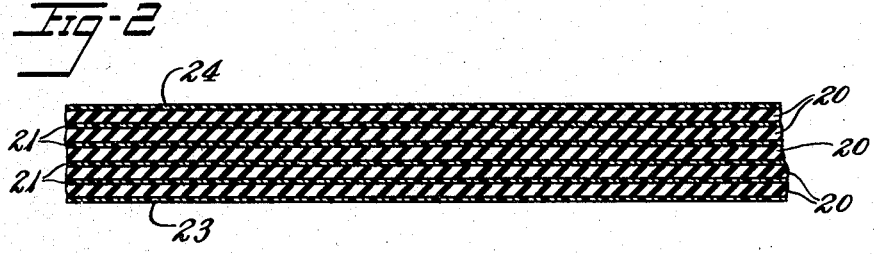
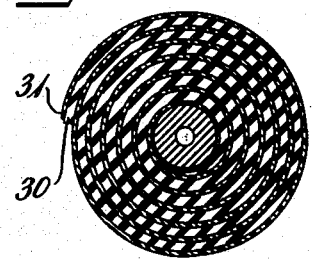
INVENTOR
John R. Hoover
By Ernest K Bean
Atty Patented Oct. 20, 1953

2,656,292

UNITED STATES PATENT OFFICE 2,656,292

SHEET RUBBER HAVING A NONSTICKING LINER AND METHOD OF MAKING SAME

John R. Hoover, Stow, Ohio, assignor to The B. F. Goodrich Company, New York, N. Y., a corporation of New York Application April 4, 1950, Serial No. 153,991

12 Claims. (Cl. 154—79)

This invention relates to liners for use in the handling, storage and transportation of tacky materials such as sheets of tacky rubber compound, friction rubberized fabric, tacky extruded rubber forms, etc., to prevent them from adhering to other pieces of rubber, to portions of the same sheet or friction fabric, or to other adjacent objects until such time as the tacky sheets or forms are put into use. Such liners find extensive use for example in preparing rolls and books of tacky sheet rubber or rubberized fabric in rubber factories.

Liners made of ordinary cotton fabric possess some desirable qualities such as flexibility and durability, but their use has been found to result in several serious disadvantages. For example, when tacky compounded or raw rubber sheets are kept in contact with the fabric for a considerable period of time (more than a few hours) or subjected to pressure in large heavy rolls or books, the viscosity of the rubber is often such that it will tend to flow and fill the interstices of the fabric, even penetrating entirely through the meshes, in which event both the sheet rubber and the cotton fabric are rendered useless. Even when the storage in rolls and books is not long and the pressure on the layers of rubber and liners is not great but the tacky material is rolled or made into books while still quite warm or the rolls or books are stored in a warm place, the adhesion between the rubber sheets and the liners becomes so intimate that the tacky sheets become extremely difficult to remove from the liners and in some cases they cannot be removed at all. Furthermore, such cotton liners when used over and over absorb and retain considerable quantities of the tacky rubber which in time renders such liners unsuitable for further use either because they will adhere even more readily to other tacky rubber sheets or will contaminate the tacky rubber sheets. Also, when portions of the cotton fabric are torn from these liners when the rubber sheet is being removed for further processing, such pieces of cotton fabric not only interfere with the assembling of built up or plied up rubber articles but also cause faults or weak points in the final article making the finished article unfit for its ultimate use.

Attempts to overcome the above discussed disadvantages encountered with the use of cotton fabric liners have been made by coating the fabric with a material to which the tacky rubber sheets does not readily adhere. Some of the coating materials which have been proposed are starch, various waxy materials, oil softened pyroxylin and the like. Also parchment paper has been suggested for use as a liner. These liners have not fully solved the problems encountered as hereinbefore described in connection with the use of cotton fabric liners. For example, portions of the waxy or pyroxylin coating or the parchment paper are often torn from the fabric and contaminate the tacky rubber sheets. The tacky rubber sheets also frequently adhere to the treated fabric or to the parchment and cannot be separated from the liner, rendering useless both the rubber sheet and the liner.

Another disadvantage of sheet fabric liners, coated fabric liners and parchment paper liners is that they cannot be salvaged or reworked when they become torn or damaged in any way.

One of the objects of this invention is to provide an improved sheet liner which will protect from contamination the surfaces of tacky materials such as tacky rubber sheets and tacky rubberized sheets either in rolls or books or other forms, but which is remarkably non-adherent to such surfaces.

Another object is to provide a liner in sheet form which will prevent tacky rubber from sticking to itself, or to adjacent objects during handling, storage and transportation but which is easily removed from contact with the tacky rubber without tearing or damaging of the liner or rubber.

Still another object is to provide a liner in sheet form which if torn or damaged can be salvaged and reprocessed into sheet form for future use.

I have discovered that excellent non-sticking liners having the properties of exceedingly high flexibility and durability, ease of separation from tacky surfaces and ability to be reprocessed, can be made entirely from thin sheets or self-sustaining films of a homogeneous mixture of a vinyl halide polymer with an interpolymer of a butadiene-1,3 hydrocarbon and an acrylic nitrile. Alternatively, liners of the same excellent characteristics can be made by coating cotton fabric or the like with a thin film of the polymeric mixture. The polymeric mixture used can contain from 5% to 95% by weight of any vinyl halide polymer and 5% to 95% by weight of any butadiene acrylic nitrile interpolymer, but the preferred homogeneous mixtures contain from 40% to 75% by weight of a vinyl chloride polymer and from 25 to 60% by weight of an interpolymer of butadiene-1,3 with acrylonitrile. Such mixtures can be prepared by mixing together the two polymers in any desired way as by milling them together as described in U. S. Patent No. 2,330,353, issued on September 28, 1943, to Donald E. Henderson, or more preferably, the homogeneous mixture can be prepared by colloidally preblending a latex of the vinyl halide polymer with a latex of a low viscosity butadiene acrylonitrile copolymer and separating the mixture from the resulting blended latex, as described in the copending application Serial No. 709,774, filed November 14, 1946, now U. S. Letters Patent No. 2,614,094.

The accompanying drawing illustrates three embodiments of this invention employing the above non-sticking liners. Fig. 1 is a sectional view of a tacky extruded rubber form 10 whose tacky surfaces are protected by non-sticking liners 11, 11.

Fig. 2 is a sectional view of a book of sheets of tacky rubber 20 separated from each other by a non-sticking liner 21 and having a non-sticking liner 23 on the tacky bottom surface of the bottom sheet of tacky rubber and non-sticking liner 24 on the tacky top surface of the top sheet of tacky rubber.

Fig. 3 is a sectional view of a roll of tacky rubber sheet 30 taken at right angles to the axis of the roll. The tacky surfaces of the continuous rubber sheet 30 are separated from one another and protected by a continuous non-sticking liner 31.

In preparing the homogeneous mixture described above use can be made of any interpolymer of any butadiene-1,3 hydrocarbon including butadiene-1,3, isoprene, dimethyl butadiene-1,3 and piperylene with any acrylic nitrile including acrylonitrile and methacrylonitrile but preferably a copolymer of butadiene-1,3 and acrylonitrile is used. The interpolymer may have been prepared by any of the known methods of preparing copolymers although it has been found that copolymers prepared by aqueous emulsion polymerization give best results. It is preferred to use the copolymers which result from the polymerization of a monomeric mixture containing 40% to 80% by weight of butadiene-1,3 and 20% to 60% by weight of acrylonitrile. Such preferred copolymers may have a Mooney viscosity, as determined by means of the Mooney viscosimeter using a 1.5" rotor after 4 minutes at 212° F. as low as 3 to 20 or as high as 100 to 120, and may range from a syrup-like consistency to a tough rubber-like consistency. Particularly preferred are the low viscosity interpolymers having a Mooney value of below 35.

The other polymer used in the homogeneous mixture is a vinyl halide polymer which may have been prepared by any of the known methods of polymerization such as the "pearl" type polymerizations or aqueous emulsion polymerizations. Preferably the vinyl halide polymer contains the vinyl halide as its predominant constituent. Examples of suitable vinyl halide polymers are the highly polymerized vinyl chloride known as gamma polyvinyl chloride and copolymers of vinyl chloride with other monomers, preferably in amounts less than 50% by weight, such as vinyl acetate, vinyl benzoate, vinylidene chloride, styrene, methyl, ethyl and octyl acrylates and methacrylates, diethyl maleate, diethyl monochloromaleate, and other monomers containing a single olefinic double bond.

The preferred homogeneous mixtures of polymeric materials for preparing the liners of this invention are those prepared by preblending a latex-like aqueous dispersion of polyvinyl chloride with a latex-like aqueous dispersion of a copolymer of 50 to 75% of butadiene-1,3 and 25 to 50% of acrylonitrile, which copolymer possesses a Mooney viscosity determined as set forth above of 3 to 20, in proportions such that there are present from 50 to 75 parts of polyvinyl chloride and from 25 to 50 parts of the copolymer, and then either coagulating the resulting blended latex and forming the coagulum into a sheet or spray-drying the blended latex to yield the mixture in the form of a dry powder. Typical examples of such materials are supplied by B. F. Goodrich Chemical Company, under the trade name "Geon polyblend 500 X 503" and "Geon polyblend 500 X 479."

Specific preparations of homogeneous mixtures containing a vinyl halide polymer and a butadiene-1,3 hydrocarbon acrylic nitrile interpolymer are set forth in the following Examples I to IV wherein all "parts" are by weight.

*Example I*

According to one method 45 parts of a rubbery copolymer prepared by the polymerization of a monomeric mixture containing 55% butadiene-1,3 and 45% acrylonitrile, having a Mooney viscosity of 80 to 120 (as determined with the Mooney viscosimeter using the large 1.5" rotor) are mixed on a two-roll mill with 55 parts powdered gamma polyvinyl chloride. The mill mixing is effected by first milling a portion of the rubbery copolymer on a mill maintained at 140° F. until it is "broken-down" and forms into a smooth band, then adding on the mill successive small portions of the polyvinyl chloride until a total of 5 parts of polyvinyl chloride are added for each part of rubbery copolymer, then adding the remainder of the rubbery copolymer while the temperature of the mill rolls is maintained at about 240 to 275° F. The resulting mixture is a tough, strong, and resilient sheet.

*Example II*

By another method a latex-like aqueous dispersion containing 40 parts of a copolymer of butadiene-1,3 and acrylonitrile prepared by the polymerization in an aqueous medium of a monomeric mixture containing 75% butadiene-1,3 and 25% acrylonitrile is mixed with a latex-like aqueous dispersion containing 60 parts of polyvinyl chloride. The resulting mixed dispersion is coagulated by addition of a 1% aqueous calcium chloride solution and the resulting mixture in the form of crumb-like particles is washed and dried.

*Example III*

A latex-like aqueous dispersion containing 30 parts of a butadiene-1,3 acrylonitrile copolymer having a Mooney viscosity of 15 to 20 (determined as above set forth) and prepared by the polymerization in an aqueous medium of a monmeric mixture containing 66% butadiene-1,3 and 33% acrylonitrile, is mixed with a latex-like aqueous dispersion containing 70 parts of polyvinyl chloride. The resulting latex-like mixture of polymeric materials is spray-dried to yield the mixture in finely divided particulate form.

*Example IV*

The low Mooney viscosity interpolymer of butadiene-1,3 with acrylonitrile described in Example III was recovered from its latex-like aqueous dispersion and washed and dried. Then 100 parts of this interpolymer and 100 parts of gamma polyvinyl chloride were mixed on a mill at a temperature of about 200° to 250° F., to obtain the mixture in the form of a strong resilient, very flexible film.

The dried particles prepared in Examples II and III can be milled or calendered to form strong continuous flexible films. Also any of the above four homogeneous mixtures can be modified by adding vulcanizing or curing agents, stabilizers, softeners, plasticizers, pigmenting materials and other compounding ingredients, if desired, and the resulting mixtures can be vulcanized, but the above-described homogeneous mixtures of polymeric materials can be and preferably are used to prepare the liners of this invention without the addition of other ingredients.

Any of the homogeneous mixtures containing a vinyl halide polymer and an interpolymer of a butadiene-1,3 hydrocarbon and an acrylic nitrile hereinbefore described can be employed to form the non-sticky liners of this invention. The following Examples V and VI, wherein preferred homogeneous mixtures are employed, illustrate the preferred liners of this invention and their use.

*Example V*

The homogeneous mixture of polyvinyl chloride with butadiene-1,3 acrylonitrile copolymer prepared in Example III is milled to form a clear sheet of about 0.25" thickness. This sheet material is then calendered into continuous self-sustaining films of from 0.001 to 0.05" thickness for use as liners. Such liners are then employed between layers of unvulcanized tire ply stock, an exceedingly tacky friction rubberized fabric, which is made into large rolls and transported to storage and left there for five days. When the stock is ready for use the exceedingly tacky tire ply layers are easily removed from the liner without any sticking of the ply stock to the liner and without any tearing of the liner.

*Example VI*

The homogeneous mixture prepared in Example IV is calendered onto both sides of cotton fabric at a film thickness of about 0.001" to form a continuous sheet liner. This liner is employed between layers of tacky unvulcanized rubber sheet which is rolled into large rolls. The rolls are then transported to a warm storage room and left there for five days after which the tacky sheet stock is unrolled for fabrication into the final product. No sticking of the tacky sheet to the liner can be observed and the liner is readily separated from the tacky sheet without any damage to the sheet or tearing of the liner.

These liners can be used for other purposes as for example to protect the tacky surfaces of rubber patching materials. They also can be used to protect the bonding surface of extruded unvulcanized tire tread or "camelback" to separate unvulcanized extruded forms from one another and to protect them from contamination.

The invention described herein has been illustrated by specific embodiments, but it is to be understood that other embodiments and modifications will occur to those skilled in the art and are within the spirit and scope of the invention as defined in the appended claims.

I claim:

1. The method of preventing adhesion between opposing surfaces of tacky vulcanizable rubber compositions which comprises interposing between said surfaces and in contact therewith a non-tacky continuous, flexible, reworkable, and self-sustaining film comprising a homogeneous mixture comprising essentially 40% to 75% by weight of gamma polyvinyl chloride and from 60 to 25% by weight of a butadiene-1,3 acrylonitrile copolymer having a Mooney viscosity of 3 to 35 as determined with a Mooney viscosimeter after 4 minutes at 212° F. using the 1.5 inch rotor, said film characterized by being readily strippable from said rubber without tearing and damaging said film and said rubber.

2. The combination of an article having a tacky surface comprising a vulcanizable rubber composition, and a protective covering for said surface held in place thereon by the inherent tackiness of said surface but readily strippable therefrom without tearing and damaging said rubber and said covering, said covering comprising a continuous, flexible, self-sustaining and reworkable non-tacky layer in contact with said surface, said layer comprising a homogeneous mixture containing essentially from 5 to 95% by weight of a vinyl halide polymer and from 95 to 5% by weight of an interpolymer of a butadiene-1,3 hydrocarbon and an acrylic nitrile, said interpolymer having a Mooney viscosity of 3 to 120 as determined by the Mooney viscosimeter after 4 minutes at 212° F. using the 1.5 inch rotor.

3. The method of making a vulcanizable article having protective means for the surface thereof which comprises forming said article from a tacky vulcanizable rubber composition, providing a continuous, flexible, self-sustaining and reworkable film comprising a homogeneous mixture containing essentially from 40% to 75% by weight of a vinyl chloride polymer and from 60 to 25% by weight of a butadiene-1,3 acrylonitrile copolymer having a Mooney viscosity of 3 to 120 as determined by the Mooney viscosimeter after 4 minutes at 212° F. using the 1.5 inch rotor, said film characterized by being readily strippable from said rubber without tearing and damaging said rubber and said film and pressing said film against the surface of said tacky article.

4. The combination of an article having a tacky surface comprising a rubber composition and a separable protective covering thereon held in contact therewith by the tackiness of said surface and being readily removable therefrom without tearing and damaging said covering and said rubber, said covering being a continuous, flexible, non-tacky, reworkable, and self-sustaining film of a homogeneous mixture consisting essentially of from 5 to 95% by weight of a vinyl halide polymer and from 5 to 95% by weight of an interpolymer of a butadiene-1,3 hydrocarbon and an acrylic nitrile having a Mooney viscosity of from 3 to 120 as determined by the Mooney viscosimeter after 4 minutes at 212° F. using a 1.5 inch rotor.

5. The combination of an article having a tacky surface comprising a vulcanizable rubber composition and a separable protective covering thereon held in contact therewith by the tackiness of said surface and being readily removable therefrom without tearing and damaging said covering and said rubber, said covering being a continuous, flexible, non-tacky, reworkable, and self-sustaining film of a homogeneous mixture consisting essentially of from 40 to 75% by weight of a vinyl chloride polymer and from 25 to 60% by weight of an interpolymer of butadiene-1,3 and acrylonitrile having a Mooney viscosity of from 3 to 120 as determined by the Mooney viscosimeter after 4 minutes at 212° F. using a 1.5 inch rotor.

6. The combination of an article having a tacky surface comprising a vulcanizable rubber composition and a separable protective covering thereon maintained in contact therewith by the tackiness of said surface and being readily strippable therefrom without tearing and damaging said covering and said rubber, said covering being a continuous, flexible, non-tacky, reworkable, and self-sustaining film of a homogeneous mixture consisting essentially of from 40 to 75% by weight of polyvinyl chloride and from 25 to 60% by weight of a butadiene-1,3 acrylonitrile copolymer having a Mooney viscosity of 3 to 35 as determined by the Mooney viscosimeter using a 1.5 inch rotor for 4 minutes at 212° F.

7. The method of protecting a tacky surface comprising a vulcanizable rubber composition from contamination and premature adhesion which comprises applying to said tacky surface a continuous, flexible, non-tacky, reworkable, and self-sustaining film from 0.001 to 0.05 inch thick of a homogeneous material consisting essentially of from 40 to 75% by weight of gamma polyvinyl chloride and 25 to 60% by weight of a butadiene-1,3 acrylonitrile copolymer having a Mooney viscosity of 3 to 35 as determined by the Mooney viscosimeter using the 1.5 inch rotor after 4 minutes at 212° F., said film characterized by being readily strippable from said rubber without tearing and damaging said film and said rubber.

8. The combination of an article having a tacky surface comprising a vulcanizable rubber composition and a protective covering for said surface held in place thereon by the inherent tackiness of said surface but readily strippable therefrom without tearing and damaging said surface and said covering, said covering comprising a fabric base and a coating thereon in contact with said surface, said coating comprising a continuous, non-tacky, flexible, self-sustaining and reworkable film containing essentially from 5 to 95% by weight of a vinyl halide polymer and from 95 to 5% by weight of an interpolymer of a butadiene-1,3 hydrocarbon and an acrylic nitrile, said interpolymer having a Mooney viscosity of 3 to 120 as determined by the Mooney viscosimeter after 4 minutes at 212° F. using the 1.5 inch rotor.

9. The combination of an article having a tacky surface comprising a vulcanizable rubber composition and a separable protective covering for said surface held in place thereon by the inherent tackiness of said surface but readily strippable therefrom without tearing and damaging said rubber and said covering, said covering comprising a continuous, flexible, self-sustaining, reworkable and non-tacky layer in contact with said surface, said layer comprising a homogeneous mixture containing essentially from 40 to 75% by weight of a vinyl chloride polymer and from 60 to 25% by weight of an interpolymer of from 40 to 80% by weight of butadiene-1,3 and from 20 to 60% by weight of acrylonitrile, said interpolymer having a Mooney viscosity of from 3 to 120 as determined by the Mooney viscosimeter after 4 minutes at 212° F. using a 1.5 inch rotor.

10. The method of protecting a tacky surface comprising a vulcanizable rubber composition from contamination and premature adhesion which comprises applying to said tacky surface a protective covering for said surface held in place thereon by the inherent tackiness of said surface but readily strippable therefrom without tearing and damaging said tacky surface of a vulcanizable rubber and said covering, said covering comprising a continuous, flexible self-sustaining, reworkable and non-tacky layer in contact with said tacky surface, said layer comprising a homogeneous mixture containing essentially from 5 to 95% by weight of a vinyl halide polymer and from 95 to 5% by weight of an interpolymer of a butadiene-1,3 hydrocarbon and an acrylic nitrile, said interpolymer having a Mooney viscosity of from 3 to 120 as determined by the Mooney viscosimeter after 4 minutes at 212° F. using the 1.5 inch rotor.

11. The method of protecting a tacky surface comprising a vulcanizable rubber composition from contamination and premature adhesion prior to vulcanization, which comprises applying to said tacky surface a protective covering for said surface held in place thereon by the inherent tackiness of said surface but readily strippable therefrom without tearing and damaging said tacky surface of a vulcanizable rubber and said covering, said covering comprising a continuous, flexible, self-sustaining, reworkable and non-tacky film in contact with said tacky surface, said film comprising a homogeneous mixture containing essentially from 40 to 75% by weight of a vinyl chloride polymer and from 60 to 25% by weight of an interpolymer of from 40 to 80% by weight of butadiene-1,3 and from 60 to 20% by weight of acrylonitrile, said interpolymer having a Mooney viscosity of from 3 to 120 as determined by the Mooney viscosimeter after 4 minutes at 212° F. using the 1.5 inch rotor.

12. The method of protecting a tacky surface comprising a vulcanizable rubber composition from contamination and premature adhesion prior to vulcanization, which comprises applying to said tacky surface a protective covering for said surface and held in place thereon by the inherent tackiness of said surface but readily strippable therefrom without tearing and damaging said tacky surface and said covering, said covering comprising a fabric base and a coating thereon in contact with said tacky surface and comprising a continuous, non-tacky, flexible, self-sustaining and reworkable film containing essentially from 5 to 95% by weight of a vinyl halide polymer and from 95 to 5% by weight of an interpolymer of a butadiene-1,3 hydrocarbon and an acrylic nitrile, said interpolymer having a Mooney viscosity of from 3 to 120 as determined by the Mooney viscosimeter after 4 minutes at 212° F. using the 1.5 inch rotor.

JOHN R. HOOVER.

References Cited in the file of this patent

UNITED STATES PATENTS

| Number | Name | Date |
| --- | --- | --- |
| 2,201,537 | Hickler | May 21, 1940 |
| 2,330,353 | Henderson | Sept. 28, 1943 |
| 2,391,986 | Leach | Jan. 1, 1946 |
| 2,459,739 | Groten et al. | Jan. 18, 1949 |
| 2,541,498 | Calvert | Feb. 13, 1951 |
| 2,572,959 | Sparks et al. | Oct. 30, 1951 |

FOREIGN PATENTS

| Number | Country | Date |
| --- | --- | --- |
| 586,447 | Great Britain | Mar. 19, 1947 |

OTHER REFERENCES

Modern Plastics, January 1950, p. 124.

Rubber Age "Geon Polyblend," August 1947, pp. 563–566.

Industrial and Eng. Chem. "Acrylonitrile-Butadiene Copolymers," August 1944, pp. 730–734.